(12) United States Patent
Miyajima et al.

(10) Patent No.: US 10,268,172 B2
(45) Date of Patent: Apr. 23, 2019

(54) REMOTE CONTROLLER

(71) Applicant: DENSO WAVE INCORPORATED, Chita-gun, Aichi-pref. (JP)

(72) Inventors: Takahiro Miyajima, Chita-gun (JP); Wataru Sugiyama, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 18 days.

(21) Appl. No.: 15/804,418

(22) Filed: Nov. 6, 2017

(65) Prior Publication Data

US 2018/0283715 A1 Oct. 4, 2018

(30) Foreign Application Priority Data

Mar. 30, 2017 (JP) ................. 2017-067924

(51) Int. Cl.

| | |
|---|---|
| F24F 11/00 | (2018.01) |
| G05B 19/048 | (2006.01) |
| F24F 11/30 | (2018.01) |
| F24F 11/62 | (2018.01) |
| F24F 11/56 | (2018.01) |
| F24F 11/38 | (2018.01) |
| F24F 110/10 | (2018.01) |
| F24F 11/63 | (2018.01) |
| F24F 11/52 | (2018.01) |

(52) U.S. Cl.
CPC ............ G05B 19/048 (2013.01); F24F 11/30 (2018.01); F24F 11/38 (2018.01); F24F 11/56 (2018.01); F24F 11/62 (2018.01); *F24F 11/52* (2018.01); *F24F 11/63* (2018.01); *F24F 2110/10* (2018.01); *G05B 2219/2614* (2013.01); *G05B 2219/37435* (2013.01)

(58) Field of Classification Search
CPC .......... G24F 11/30; G24F 11/38; G24F 11/52; G24F 11/56; G24F 11/62; G24F 11/63
See application file for complete search history.

(56) References Cited

U.S. PATENT DOCUMENTS

| | | | | |
|---|---|---|---|---|
| 2015/0276239 A1* | 10/2015 | Fadell | ................ | G05D 23/1905 237/2 A |
| 2016/0178230 A1* | 6/2016 | Vendt | ...................... | F24F 13/20 236/1 C |

FOREIGN PATENT DOCUMENTS

JP 2017-022598 A 1/2017

* cited by examiner

*Primary Examiner* — Mark A Connolly
(74) *Attorney, Agent, or Firm* — Oliff PLC

(57) ABSTRACT

A remote controller controlling an air-conditioning apparatus includes: a main part, a three-axis acceleration sensor; a normality determination part that determines whether an installation state of the remote controller is in a normal installation state or in an abnormal installation state, based on a detection value of the acceleration sensor; a stationary state determination part that determines whether the installation state is in a stationary state; a vibration determination part that determines whether a vibration occurs; a thermo sensor; and a control part that controls the air-conditioning apparatus. The main part includes a back face, a front face, and a bottom. The remote controller is in the abnormal installation state due to a shape and a centroid when the remote controller is placed on a horizontal surface. The control part performs a limited control that includes limitation of a control of the air-conditioning apparatus based on the environment temperature.

14 Claims, 15 Drawing Sheets

REMOTE CONTROLLER

CROSS REFERENCE TO RELATED APPLICATION

This application is based on Japanese Patent Application No. 2017-067924 filed on Mar. 30, 2017, the disclosure of which is incorporated herein by reference.

TECHNICAL FIELD

The present disclosure relates to a remote controller of an air-conditioning apparatus.

BACKGROUND

The patent document 1 shows a remote controller used while being installed on a wall surface. The remote controller includes a main part having an operation part, the operation part operated by a user, a three-axis acceleration sensor to detect an acceleration to be applied to the main part, a thermo sensor and a control part. The thermo sensor is placed inside the remote controller and detects an environment temperature. The control predetermines whether the remote controller is installed on the wall surface, by detecting whether a detection value of the three-axis acceleration sensor deviates from a permissible range and also detecting the detection value remains constant for a predetermined range. In the case of determination that the remote controller is not installed on the wall surface, an operation to the operation part is invalidated.

Patent document 1: JP 2017-22598 A

SUMMARY

When the value of there-axis acceleration obtained by the three-axis acceleration sensor is equal to a certain value and the remote controller is not installed on the wall surface or a cradle, a control of an air-conditioning apparatus may be limited. For example, when the remote controller of the air-conditioning apparatus with a thermo sensor is not placed on a predetermined regular position such as on the wall surface or cradle, the thermo sensor may not detect the environment temperature precisely. Therefore, even in the stationary state, a control of the air-conditioning apparatus using the environment temperature may not be performed precisely.

It is an object of the present disclosure to provide a remote controller capable of controlling an air-conditioning apparatus.

According to one aspect of the present disclosure, a remote controller capable of controlling an air-conditioning apparatus includes: a main part that includes, a back face facing toward a wall surface when the remote controller is installed on the wall surface, a front face opposite to the back face in the main part, and a bottom facing a downward direction corresponding to a gravitational direction when the remote controller is installed on the wall surface; a three-axis acceleration sensor that detects three-axis accelerations applied to the main part; a normality determination part that determines whether an installation state of the remote controller is in a normal installation state or in an abnormal installation state, based on a detection value of the three-axis acceleration sensor; a stationary state determination part that determines whether the installation state of the remote controller is in a stationary state based on the detection value of the three-axis acceleration sensor; a vibration determination part that determines whether a vibration occurs in the remote controller based on the detection value of the three-axis acceleration sensor; a thermo sensor that measures environment temperature; and a control part that controls the air-conditioning apparatus based on the environment temperature measured by the thermo sensor. The main part has a particular shape and a centroid, and the remote controller is in the abnormal installation state due to the shape and the centroid when the remote controller is placed on a horizontal surface with the bottom of the main part downward. The control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

According to another aspect of the present disclosure, a remote controller capable of controlling an air-conditioning apparatus includes: a main part that includes a back face facing toward a wall surface when the remote controller is installed on the wall surface, a front face opposite to the back face in the main part, and a bottom facing a downward direction corresponding to a gravitational direction when the remote controller is installed on the wall surface; a two-axis acceleration sensor that detects, when the remote controller is installed on the wall surface, an acceleration in a direction perpendicular to the front face of the main part and an acceleration in the gravitational direction; a normality determination part that determines whether the installation state of the remote controller is in a normal installation state or in an abnormal installation state based on a detection value of the two-axis acceleration sensor; a stationary state determination part that determines whether the installation state of the remote controller is in a stationary state based on the detection value of the two-axis acceleration sensor; a vibration determination part that determines whether a vibration occurs in the remote controller based on the detection value of the two-axis acceleration sensor; a thermo sensor that measures environment temperature; and a control part that controls the air-conditioning apparatus based on the environment temperature measured by the thermo sensor. The main part has a particular shape and a centroid, and the remote controller is in the abnormal installation state due to the shape and the centroid when the remote controller is placed on a horizontal surface with the bottom of the main part downward. The control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

According to the remote controller, the control part limits the control of the air-conditioning apparatus based on the environment temperature when the stationary state part determines to be in the stationary state and the normality determination part determines to be in the abnormal installation state within the predetermined period of time immediate after the vibration determination part determines that the vibration occurs. Therefore, when the remote controller in the abnormal installation does not measure the environment temperature precisely, it may be possible to prevent the control of the air-conditioning apparatus from being erroneously performed. When the remote controller is not installed in the wall surface even in the stationary state, the remote controller can easily fall down due to the shape of the main part or the centroid. The vibration part can effectively detect the vibration that occurs when the remote controller falls down. When the remote controller is installed on the wall surface, the vibration does not occur since the remote controller is fastened without falling down. When the remote controller stops within the predetermined period of time after the vibration is detected, it may be possible to determine that the remote controller is placed in another place without installation on the wall surface. Therefore, it may be possible to detect the installation state of the remote controller, that is, a state where the remote controller becomes still without installation on the wall surface.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
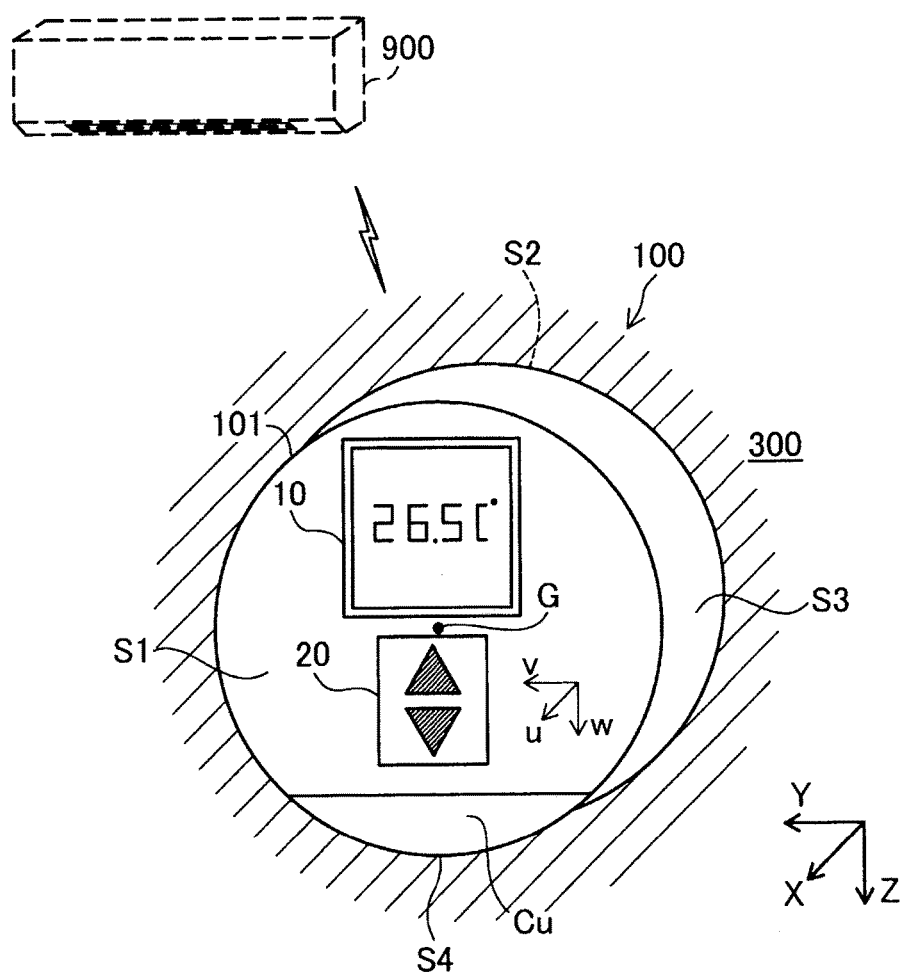
FIG. 1 is an external view illustrating of the remote controller according to a first embodiment of the present disclosure.

FIG. 1 is the external view illustrating of a remote controller 100 according to the first embodiment of the present disclosure. As shown in FIG. 1, the remote controller 100 is installed on a wall surface 300 that is parallel to a vertical direction. The remote controller 100 is apparatus to remotely control an air-conditioning apparatus 900. As shown in FIG. 1, a Z direction may be referred to as a vertical direction. An X direction corresponds to a direction perpendicular to the wall surface 300. A Y direction corresponds to a direction perpendicular to the X and the Z direction, and may be referred to as a horizontal direction.

The remote controller 100 includes a main part 101, a display part 10 and an operation part 20. The main part 101 has an external shape being substantially disk-like shape (or a substantially cylindrical shape). The main part 101 includes a front face S1, a back face S2, a side face S3, a bottom portion S4 and a slope face Cu. Incidentally, the bottom portion S4 may be referred to as a bottom, or a bottom part. The back face S2 faces the wall surface 300 when the remote controller 100 is installed on the wall surface 300. The front face S1 has an opposite face to the back face S2 in the remote controller 100. The side face S3 surrounds a rim between the front face S1 and the back face S2. The bottom portion S4 corresponds to a downward part when the remote controller 100 is installed on the wall surface 300, and continued to the side face S3. According to the first embodiment, the bottom portion S4 of the remote controller 100 has a slope surface. The slope face Cu is notified to the front face S1 and bottom portion S4, and inclines from the front face S1 towards the back face S2. A centroid G of the main part 101 is provided in nearly center of the main part 101 with planer view observed along the X direction. A relation between the centroid G and a shape of the main part 101 is described below.

The display part 10 and the operation part 20 are placed in the front face S1. The display part 10 includes, for example, a liquid crystal panel. The display part 10 displays a current status (for example, an air quantity, a mode of operation, a present temperature, or the like) of the air-conditioning apparatus 900, and displays an input content inputted from the operation part 20. The operation part 20 includes, for example, a capacitive touch panel. A user inputs an input operation to the operation part 20 in order to control the air-conditioning apparatus 900.

Figure 2:
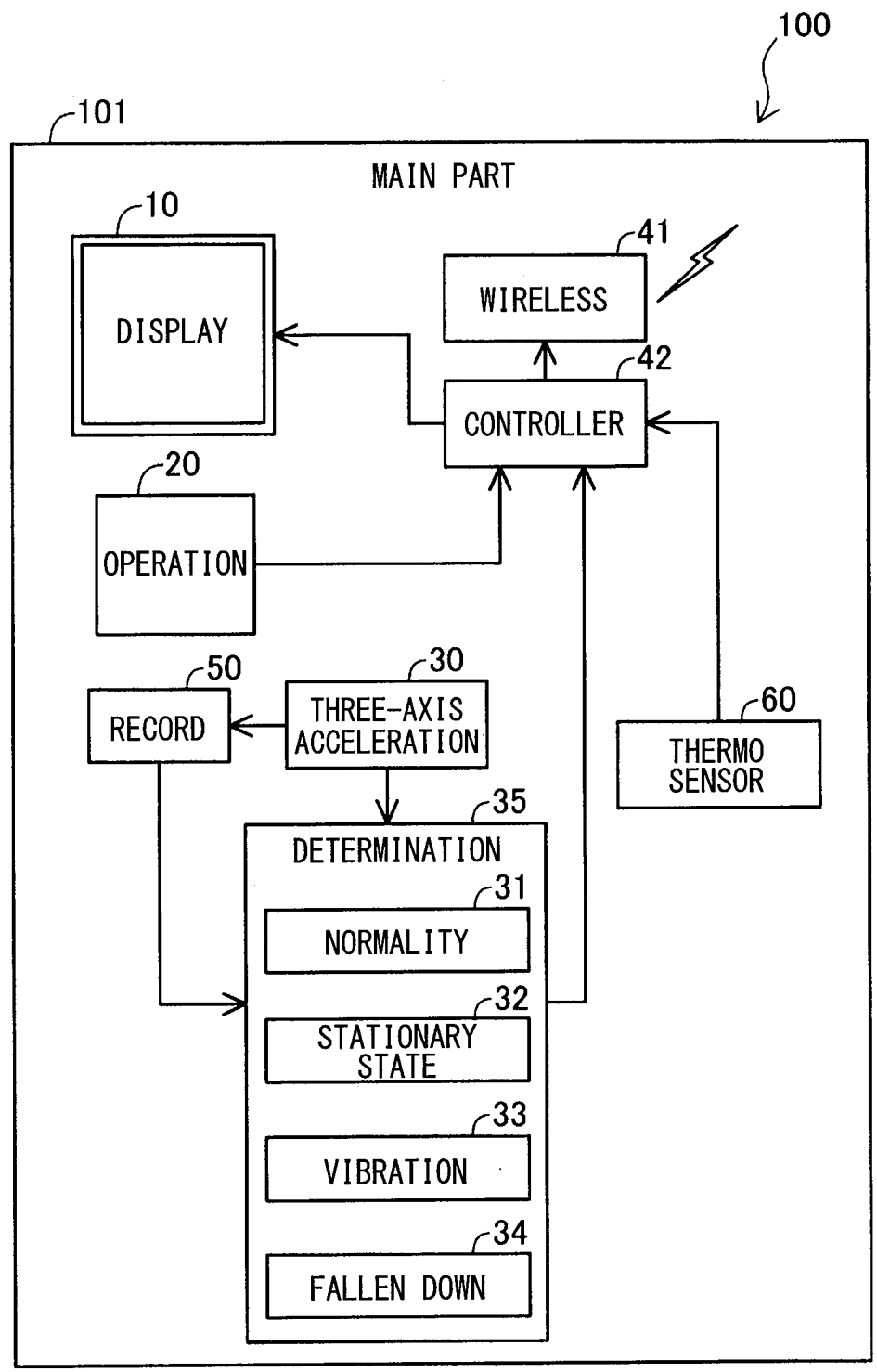
FIG. 2 is a block diagram illustrating a configuration of the remote controller.

FIG. 2 is a block diagram illustrating a configuration of the remote controller. As shown in FIG. 2, the remote controller 100 includes the main part 101, the display part 10, the operation part 20, a three-axis acceleration sensor 30, a determination part 35, a recording part 50, a wireless communication part 41, a control part 42 and a thermo sensor 60.

The operation part 20 notifies an inputted operation content of the control part 42. The thermo sensor 60 measures the environment temperature. The control part 42 controls the air-conditioning apparatus 900 by using the input operation notified from the operation part 20 and the environment temperature notified from the thermo sensor 60. In particular, the control part 42 generates a control information (for example, an air quantity, an air direction, a set temperature and the environment temperature). The control part 42 transmits the control information to the air-conditioning apparatus 900 through the wireless communication part 41. The control part 42 may control the air-conditioning apparatus 900 only by using the environment temperature measured by the thermo sensor 60. The control part 42 causes the display part 10 to display the operation content notified from the operation part 20. The control part 42 includes, for example, such as microprocessor and memory.

The three-axis acceleration sensor 30 detects an acceleration applied to the main part 101. In particular, FIG. 1 shows the three-axis acceleration sensor 30 detects accelerations of each of the u-axis, the v-axis and the w-axis directions to the main part 101. FIG. 1 illustrates an example that the u-axis shows a direction perpendicular to the front face S1 of the main part 101, the v-axis shows a direction parallel to the front face of the main part 101 and the w-axis shows the perpendicular direction to the u-axis and the v-axis. When the remote controller 100 is installed on the wall surface 300, the u-axis is matched with the X-axis, the v-axis is matched with the Y direction (that is, the horizontal direction), and the w-axis is matched with Z direction (that is, the vertical direction). The three-axis acceleration sensor 30 notifies a detection value of the acceleration of a normality determination part 31. The three-axis acceleration sensor 30 notifies the detection value of the recording part 50. The recording part 50 records the detection value. Incidentally, instead of the three-axis acceleration sensor 30, a two-axis acceleration sensor may be used. It may be preferable that the two-axis acceleration sensor detects the acceleration of the u-axis in the perpendicular direction to the front face S1 of the main part 101, and the acceleration of the w-axis in a gravity direction of the main part 101.

For example, the determination part 35 is configured from a microcomputers or the like. The determination part 35 includes the normality determination part 31, a stationary state determination part, a vibration determination part 33, and a falling down determination part 34.

The normality determination part 31 determines whether an installation state of the remote controller 100 is normal by using the detection value of the three-axis acceleration sensor 30. In other words, the normality determination part 31 determines whether the installation state of the remote controller 100 corresponds to a normal installation state or abnormal installation state.

The stationary state determination part 32 determines whether the remote controller 100 is in a stationary state. Specifically, it is determined that the remote controller 100 is in the stationary state when the detection value of the three-axis acceleration sensor 30 remains within a predetermined permissible range within a particular period of time. It is determined that the remote controller 100 is not in the stationary state when the detection value of the three-axis acceleration sensor 30 exceeds the predetermined permissible range. The particular period of time is time to determine whether the remote controller 100 is stationary state, and is, for example, between 2 and 5 seconds. The permissible range is, for example, between ±2 m/s2 with respect to an average of the detection value. In other words, the permissible range corresponds to a value obtained by adding ±2 m/s2 to the average of the determination value.

The vibration determination part 33 determines, based on the three-axis acceleration sensor 30, whether the remote controller 100 vibrates. In particular, the vibration determination part 33 determines that the vibration occurs when the detection value detected by the three-axis acceleration sensor 30 exceeds the permissible range. The vibration determination part 33 determines that the vibration does not occur when the detection value detected by the three-axis acceleration sensor 30 is included within the permissible range.

It is supposed that, within a predetermined period of time immediate after the vibration determination part 33 determines that the vibration occurs, the stationary state determination part 32 determines that the remote controller 100 is in the stationary state and also the normality determination part 31 determines that the installation state of the remote controller 100 is in an abnormal installation state. In this case, the falling down determination part 34 determines that the installation state of the remote controller 100 is in a fall state. The falling down determination part 34 may be omitted.

The determination result of the determination part 35 is notified to the control part 42. It is supposed that, within a predetermined period of time immediate after the vibration determination part 33 determines that the vibration occurs, the stationary state determination part 32 determines that the remote controller 100 is in the stationary state and also the normality determination part 31 determines that the installation state of the remote controller 100 is in an abnormal installation state. In this case, the control part 42 limits the control of the air-conditioning apparatus 900 based on the environment temperature measured by the thermo sensor 60, so that the control part 42 performs a control with limitation by which the control of the air-conditioning apparatus 900 by the input operation to the operation part 20 is limited. The control part 42 may limit only the control of the air-conditioning apparatus 900 based on the environment temperature. These limitations include, for example, to invalidate the detection of the environment temperature and the input operation to the operation part 20.

Figure 3A:
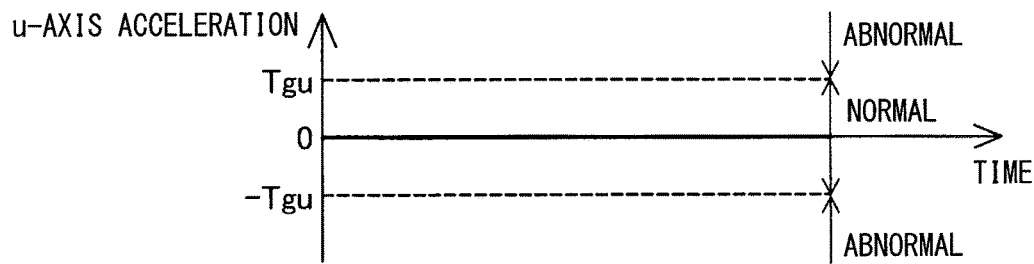
FIG. 3A is a diagram illustrating the u-axis acceleration of the remote controller that is installed on the wall surface.
Figure 3B:
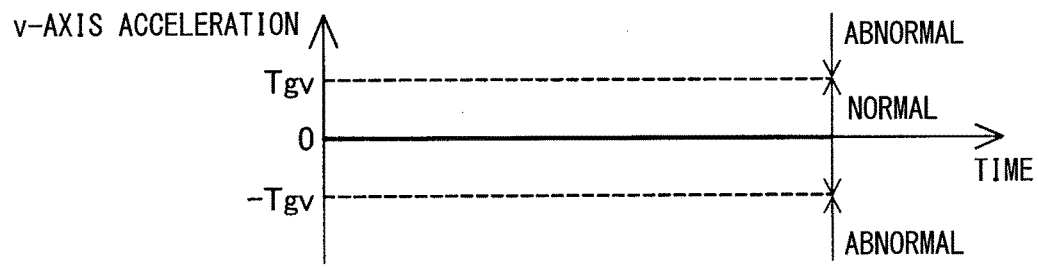
FIG. 3B is a diagram illustrating the v-axis acceleration of the remote controller that is installed on the wall surface.
Figure 3C:
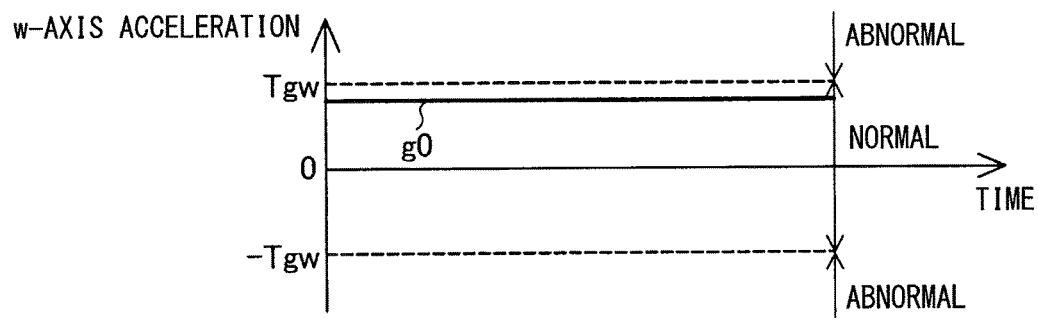
FIG. 3C is a diagram illustrating the w-axis acceleration of the remote controller that is installed on the wall surface.

FIG. 3A, FIG. 3B, and FIG. 3C are diagrams illustrating the u-axis, v-axis and w-axis acceleration of the remote controller that is installed on the wall surface 300. In the stationary state where the remote controller 100 is installed on the wall surface 300, the u-axis and v-axis accelerations are equal to 0, and the w-axis acceleration corresponds to a gravitational acceleration which equals to g0 (9.8 m/s$^2$). Thresholds Tgu, Tgv and Tgw are set to the accelerations of each axis (the u-axis acceleration, the v-axis acceleration and the w-axis acceleration). When these thresholds Tgu, Tgv and Tgw are unnecessary to be distinguished in the present application, these thresholds are described as "threshold Tg".

The three-axis thresholds Tgu, Tgv and Tgw determine the installation state of the remote controller 100. When the absolute value of the acceleration of each axis is less than the threshold Tg of the corresponding axis, the installation state is determined as normal. When the absolute value of the accelerations of each axis is equal to or more than the threshold Tg of the corresponding axis, the installation state is determined as abnormal. The thresholds Tgu and Tgv are less than the gravitational acceleration g0, and for example, may be set to a value between 9.0 and 9.5 m/s$^2$. The threshold Tgw is more than the gravitational acceleration g0. For example, the threshold Tgw may be set to a value between 10.5 and 12.0 m/s² can be adopted. It is determined that the installation state is normal since the absolute value of the acceleration of the w-axis is less than the threshold Tgw of the w-axis. Therefore, it is determined to be in a normal installation state when the remote controller 100 is installed on the wall surface 300.

Figure 4:
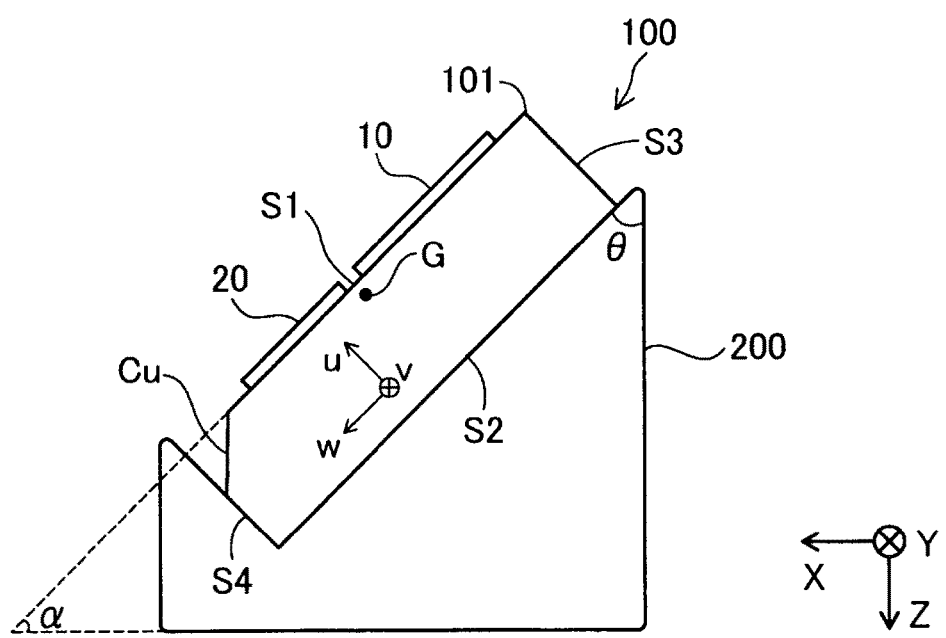
FIG. 4 is a diagram illustrating a status where the remote controller is placed on a cradle.

FIG. 4 is the external view illustrating of the remote controller 100 placed on a cradle 200. When the remote controller 100 is installed on the cradle 200, the back face S2 of the main part 101 and the bottom portion S4 are placed on the cradle 200. The front face S1 faces obliquely upward. The back face S2 is inclined by the degree θ from the vertical direction.

Figure 5A:
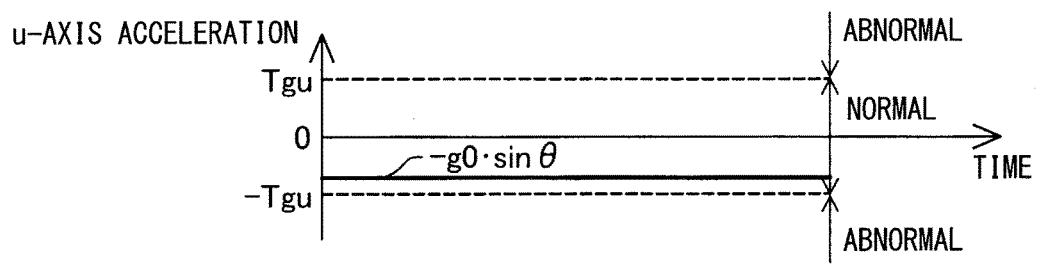
FIG. 5A is a diagram illustrating the u-axis acceleration of the remote controller that is placed on the cradle.
Figure 5B:
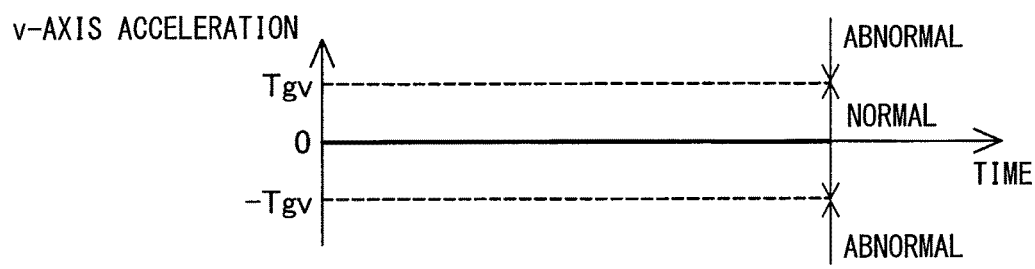
FIG. 5B is a diagram illustrating the v-axis acceleration of the remote controller that is placed on the cradle.
Figure 5C:
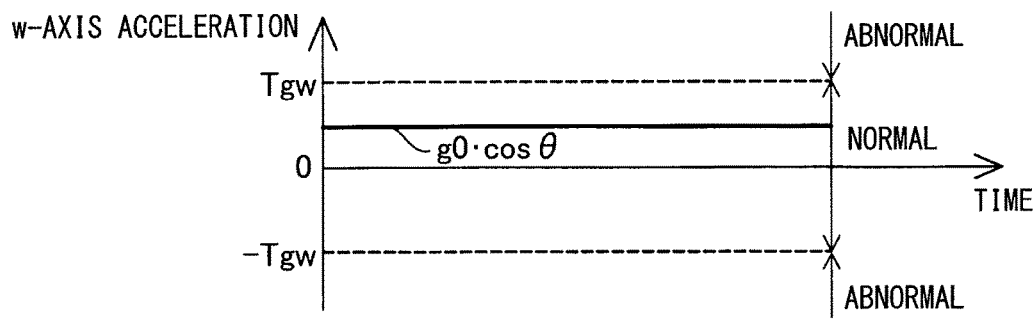
FIG. 5C is a diagram illustrating the w-axis acceleration of the remote controller that is placed on the cradle.

FIG. 5A, FIG. 5B and FIG. 5C are diagrams illustrating the u-axis, the v-axis and the w-axis accelerations of the remote controller 100 installed on the cradle 200. In a case of the stationary state that the remote controller 100 is installed on the cradle 200, the u-axis acceleration is expressed as $-g0 \times \sin \theta$. For example, when the degree θ is equals to 45°, $g0 \times \sin \theta = 6.9$ m/s². The installation state is determined to be normal since the absolute value of the u-axis acceleration $-g0 \times \sin \theta$ is less than the absolute value of thresholds Tgu. Regarding the w-axis acceleration, the similar explanation will be applied. Therefore, the installation state is determined as normal installation when the remote controller 100 is installed on the cradle 200.

Figure 6A:
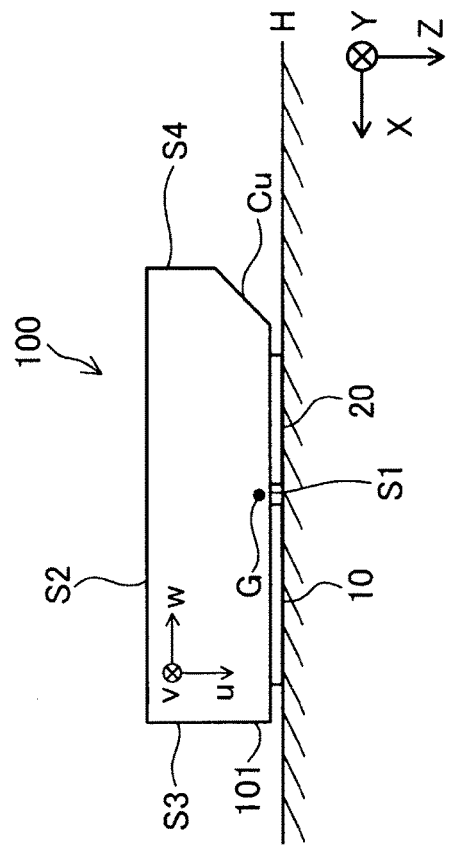
FIG. 6A is a diagram illustrating a status where the remote controller falls down.
Figure 6B:
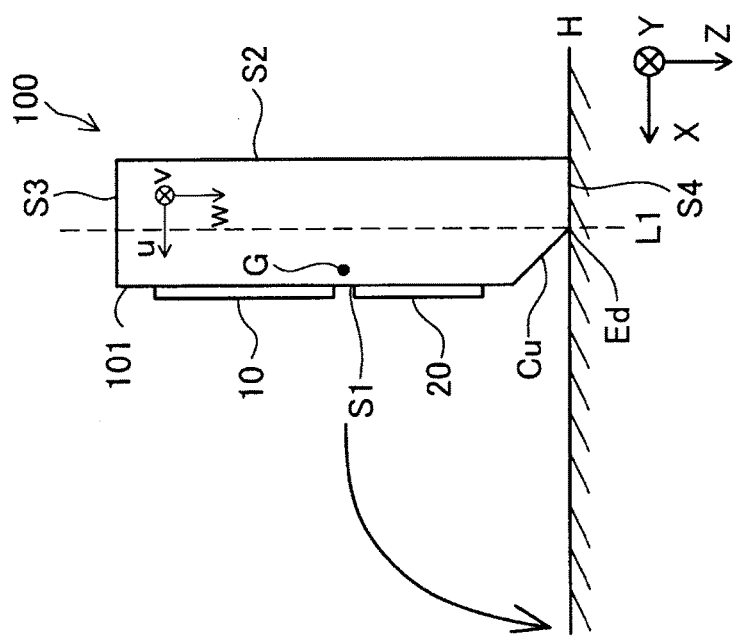
FIG. 6B is a diagram illustrating a status where the remote controller falls down.

FIG. 6A illustrates a state of the remote controller 100 when the bottom portion S4 is placed on a horizontal surface H. FIG. 6A and FIG. 6B illustrate a side view of the remote controller 100, which has fallen down. FIG. 6A illustrates a side view before the remote controller 100 falls down. A line L1 corresponds to the vertical direction, and goes through an edge Ed of the bottom portion S4. A centroid G of the remote controller 100 is positioned outside the line L1. In another words, the centroid G is positioned a side of the front face S1 closer than a side of the back face S2. In this state, a gravitational affection applied to the centroid G causes a moment of force at the edge Ed of the bottom portion S4. The moment of force is applied to the remote controller 100. Therefore, the remote controller 100 falls down with the front face S1 downward as illustrated by an arrow in FIG. 6A.

Figure 7A:
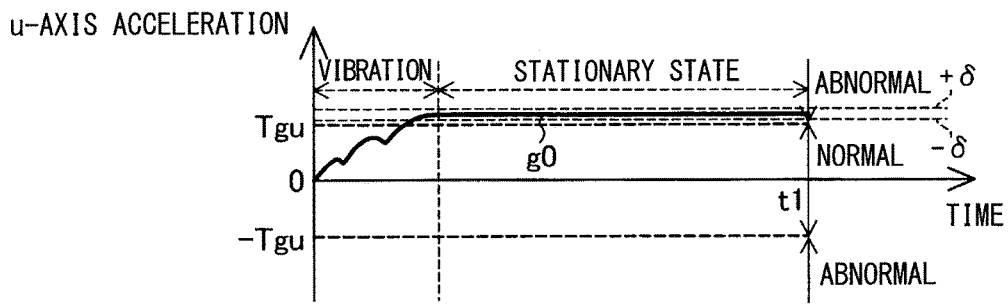
FIG. 7A is a diagram exemplifying the u-axis acceleration when the remote controller falls down.
Figure 7B:
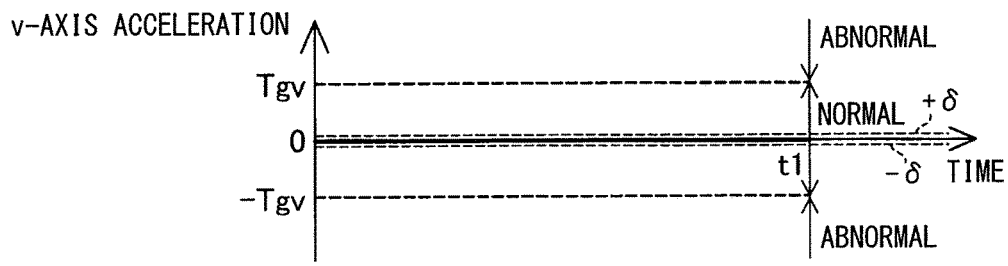
FIG. 7B is a diagram exemplifying the v-axis acceleration when the remote controller falls down.
Figure 7C:
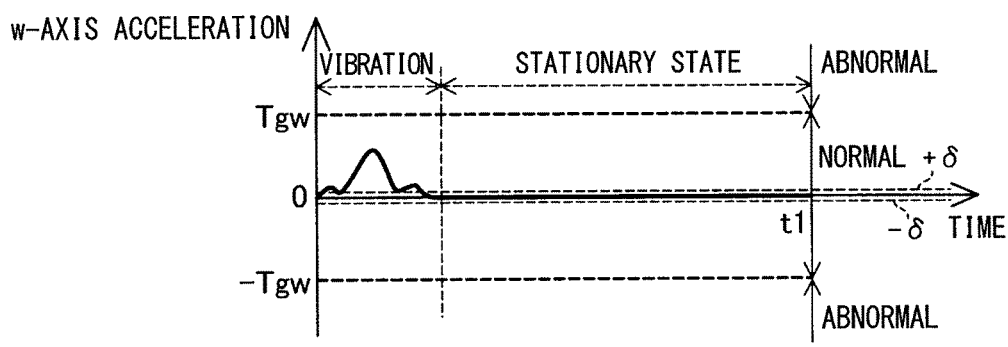
FIG. 7C is a diagram exemplifying the w-axis acceleration when the remote controller falls down.

FIG. 7A, FIG. 7B, and FIG. 7C respectively are diagrams exemplifying the u-axis, the v-axis and the w-axis acceleration when the remote controller 100 falls downward onto the front face S1, as shown FIG. 6A and FIG. 6B. While the remote controller 100 is falling down, the u-axis and w-axis accelerations exceed the permissible range that is expressed as "the average value ±δ". The δ corresponds to a permissible vibration quantity. The vibration determination part 33 determines whether the vibration of the remote controller 100 occurs. In the stationary state after the remote controller 100 has fallen down, the u-axis, the v-axis and the w-axis accelerations remain within the permissible range corresponding to the average value ±δ within a particular period of time t1. Therefore, the stationary state determination part 32 determines that the remote controller 100 is in the stationary state. That is, it is determined that, within a predetermined period of time immediate after the vibration determination part 33 determines that the vibration occurs, the stationary state determination part 32 determines that the remote controller 100 is in the stationary state.

In the stationary state where the remote controller 100 has fallen down, the u-axis acceleration is equal to the gravitational acceleration g0 and the u-axis and the v-axis accelerations are equal to 0. The installation state is determined to be abnormal since the absolute value of the u-axis acceleration is more than the absolute value of the threshold Tgu. The state that the remote controller 100 falls downward onto the front face S1 of the main part 101 is determined to be in the abnormal installation state. FIG. 7A, FIG. 7B, and FIG. 7C show that, within the predetermined period of time t1 immediate after the vibration determination part 33 determines that the vibration occurs, the stationary state determination part 32 determines the installation of the remote controller 100 to be in the stationary state and the normality determination part 31 determines the installation of the remote controller 100 to be in the abnormal installation state. Therefore, the control part 42 limits the control of the air-conditioning apparatus 900 referring to the environment temperature measured by the thermo sensor 60.

Figure 8:
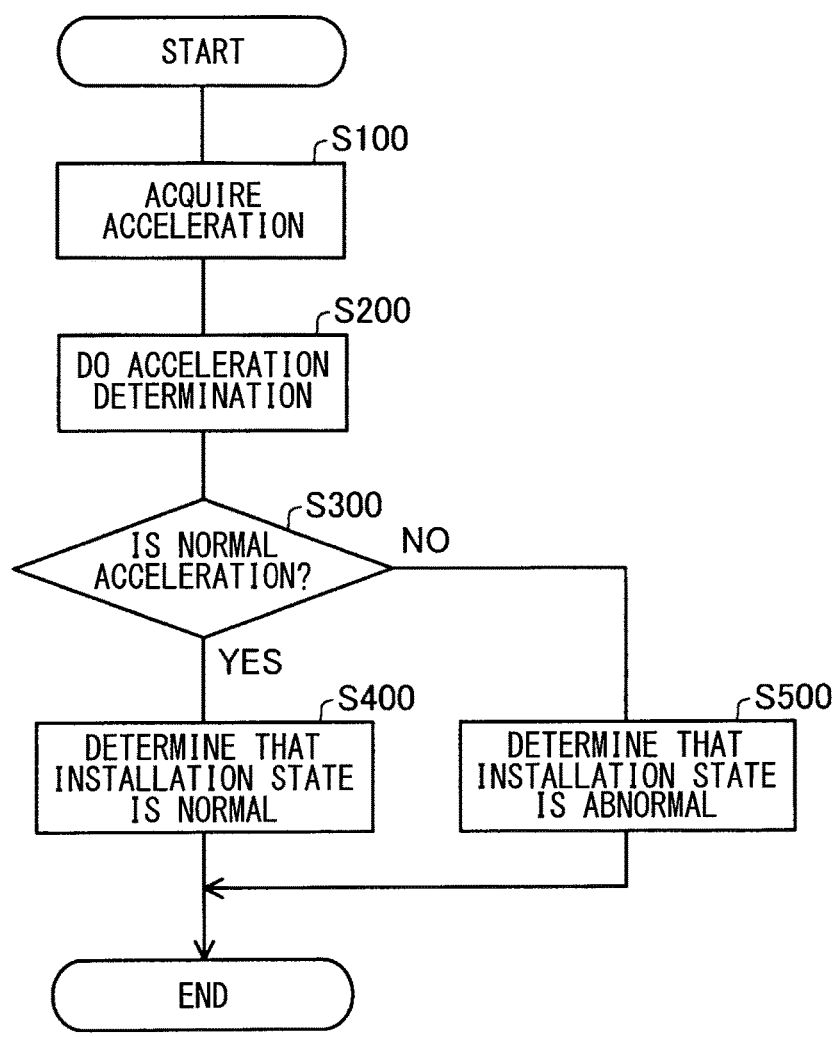
FIG. 8 is a flowchart illustrating an example to determine an installation state.

FIG. 8 is a flowchart illustrating an example to determine an installation state of the remote controller 100 performed by the normality determination part 31. In S100, the normality determination part 31 acquires the axis acceleration of each axis of the main part 101 of the remote controller 100 detected by the three-axis acceleration sensor 30. In S200, the normality determination part 31 determines whether the absolute value of the each of the axis acceleration of the main part 101 is less than the absolute value of the threshold Tg of the axis. In S300, the normality determination part 31 determines as normal acceleration when the absolute value of the acceleration of all axis of the main part 101 is less than the threshold Tg of the axis, and moves to S400. The normality determination part 31 determines as abnormal acceleration when the absolute value of the acceleration of at least one of the main part 101 is equal to or more than the threshold Tg of the corresponding axis, and moves to S500.

In S400, the normality determination part 31 determines the installation state of the remote controller 100 as normal, and the determination process of the installation state ends. In S500, the normality determination part 31 determines the installation state as abnormal and the determination process of the installation state ends. In the case of determination as abnormal, the control part 42 limits the control of the air-conditioning apparatus 900 related to the input operation to the operation part 20, and the control part 42 stops transmitting the control information to the air-conditioning apparatus 900. Further, an alarm part (not shown) may generate an alarm.

The shape of the main part 101 and the centroid G may be configured so that the remote controller 100 falls downward onto the back face S2 when the remote controller 100 is placed on the horizontal surface H with the bottom portion S4 of the main part 101 downward. The u-axis acceleration of the main part 101 is equal to $-g0$ when the remote controller 100 falls downward onto the back face S2. When the u-axis acceleration is equal to $-g0$, the absolute value of the u-axis acceleration is equal to or more than the absolute value of the u-axis threshold $-Tgu$. Therefore, the installation state is determined to be in the abnormal installation. However, when the remote controller 100 falls down with the front face S1 downward, there is a high possibility that a user corrects the installation state of the remote controller 100. It may be possible to limit from performing the input operation during an abnormal installation state.

As described above, the shape and the centroid G of the main part 101 are configured so that the remote controller 100 falls downward onto the front face S1 or the back face S2 when the remote controller 100 is placed on the horizontal surface H with the bottom portion S4 of the main part 101 downward. According to this configuration, the remote controller 100 can easily become the state with the front face S1 or the back face S2 being located downwardly. It may be possible to easily determine the abnormal determination of the installation state of the remote controller 100.

As described above, in the first embodiment, it is supposed within the predetermined period of time immediate after the vibration determination part 33 that the vibration occurs, the stationary state determination part 32 determines the installation of the remote controller 100 to be in the stationary state and also the normality determination part 31 determines the installation of the remote controller 100 to be in the abnormal installation state predetermined period of time. In that case, the control part 42 limits the control of the air-conditioning apparatus 900. Therefore, when the remote controller 100 does not measure the environment temperature precisely, it may be possible to prevent from erroneously controlling of the air-conditioning apparatus 900.

The control part 42 may limit the control of the air-conditioning apparatus 900 based on the environment temperature, when the predetermined period of time t1 (for example, 2 seconds) and also over the predetermined number of time (for example, 10 times) or same times immediate after the vibration determination part 33 that vibration occurs, the stationary state determination part 32 determines the installation of the remote controller 100 to be in the stationary state and also the normality determination part 31 determines the installation of the remote controller 100 to be in the abnormal installation state. Even when it is immediately determined as the abnormal state by a small vibration, it may be possible to limit from limiting the control of the air-conditioning apparatus 900.

The cradle 200 of FIG. 4 is configured so that the front face S1 of the main part 101 of the remote controller 100 inclined α degree (α>0) from the horizontal direction when the remote controller 100 is installed on the cradle 200. When the remote controller 100 is installed on the cradle 200, it is determined that the remote controller 100 is in the normal installation.

(Second Embodiment)

Figure 9:
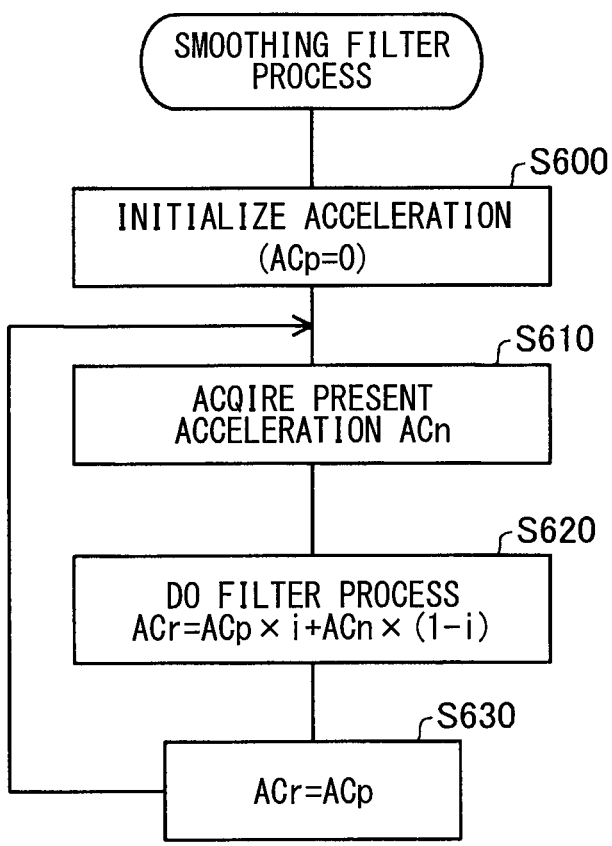
FIG. 9 is a diagram illustrating an algorithm of a smoothing filter according to a second embodiment of the present disclosure.

FIG. 9 is a diagram illustrating an algorithm of a smoothing filter process to the detection value of the three-axis acceleration sensor 30 according to a second embodiment. The smoothing filter process is utilized to determine as the abnormal installation, while a state where a user carries the remote controller 100. According to the second embodiment, in S200 of FIG. 8, according to the first embodiment, the normality determination part 31 performs the smoothing filter process to the detection value of the acceleration obtained by the three-axis acceleration sensor and determines whether the remote controller 100 is in the normal installation state based on the result of the smoothing filter process.

The smoothing filter process is performed, for example, according to expression (1).

$$ACr = ACp \times i + ACn \times (1-i) \tag{1}$$

ACr represents a preset acceleration after the smoothing process calculated in the present.
ACp represents a previous acceleration after the smoothing process calculated in a last time.
i represents filter constant.
ACn represents present acceleration.

According to FIG. 9, in S600, ACp is initialized to 0. In S610, the detection value of the three-axis acceleration sensor 30 is obtained, in another word, the present acceleration ACn is obtained. In S620, the smoothing filter process is performed referring to the present acceleration ACn of S610. In S 630, the acceleration ACr after the smoothing filter process calculated in S620 is substituted in the acceleration ACp, and the process returns to S610. The process from S610 to S630 is performed on a background at all time with respect to the u-axis, the v-axis and the w-axis.

Figure 10:
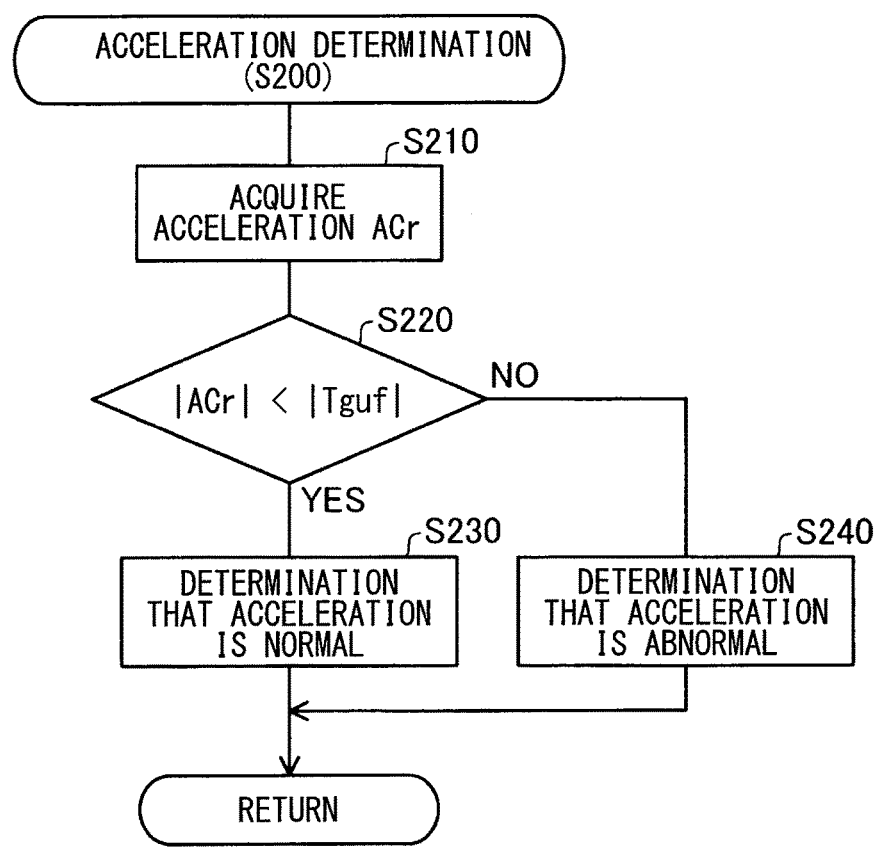
FIG. 10 is a flowchart illustrating an example of acceleration determination.

FIG. 10 is a flowchart illustrating an example of acceleration determination and a subroutine of S200 according to the first embodiment of FIG. 8. A process of FIG. 10 is performed to the u-axis, the v-axis and the u-xis. As an example, the u axis will be explained. In S210, the normality determination part 31 obtains the acceleration ACr after the smoothing filter process of FIG. 9. In S220, the normality determination part 31 determines whether the absolute value of the acceleration ACr obtained in S210 is less than the absolute value of the u-axis threshold Tguf. The u-axis threshold Tgu is the threshold to determine the acceleration ACr after the smoothing filter process. The u-axis threshold Tgu can be adopted, for example, between 7.5 and 8.0 m/s$^2$. When the absolute value of the acceleration ACr is less than the u-axis threshold Tgu, the acceleration is determined as normal and the process moves to S230. When the absolute value of the acceleration ACr is equal to or more than the absolute value of the u-axis threshold Tgu, S240 is performed.

When the main part 101 of the remote controller 100 falls downward onto the front face S1, the acceleration ACr=g0 is obtained by the smoothing filter process to the u-axis acceleration g0 (FIG. 7A) obtained at that time. The acceleration is determined as abnormal since the absolute value of the acceleration ACr (g0) is equal to or more than the absolute value of the u-axis threshold Tguf. Therefore, it is determined that the installation state of the remote controller 100 is abnormal. The u-axis acceleration −g0 obtained when the main part 101 of the remote controller 100 falls down with the back face S2 downward same as above.

Figure 11:
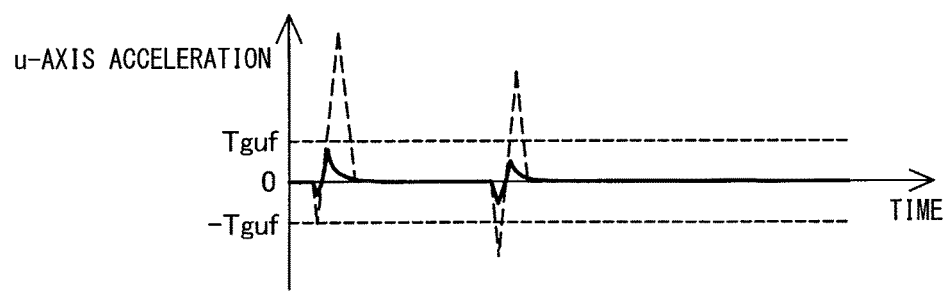
FIG. 11 is a diagram exemplifying a change of the acceleration when an input operation inputs.

FIG. 11 is a diagram exemplifying a change of the u-axis acceleration while an input operation is performed, in a state when the remote controller 100 is installed on the wall surface 300. A broken line shows a graph of the change of an actual acceleration. A solid line shows a graph of the change of the u-axis acceleration after the smoothing filter process. When the input operation is performed, the acceleration of the u-axis direction applies to the main part 101 of the remote controller 100. The actual u-axis acceleration exceeds the range between the u-axis threshold −Tguf and the u-axis threshold Tguf and the u-axis acceleration after the smoothing filter process does not exceed the range between the u-axis threshold −Tguf and the u-axis threshold Tguf.

Figure 12:
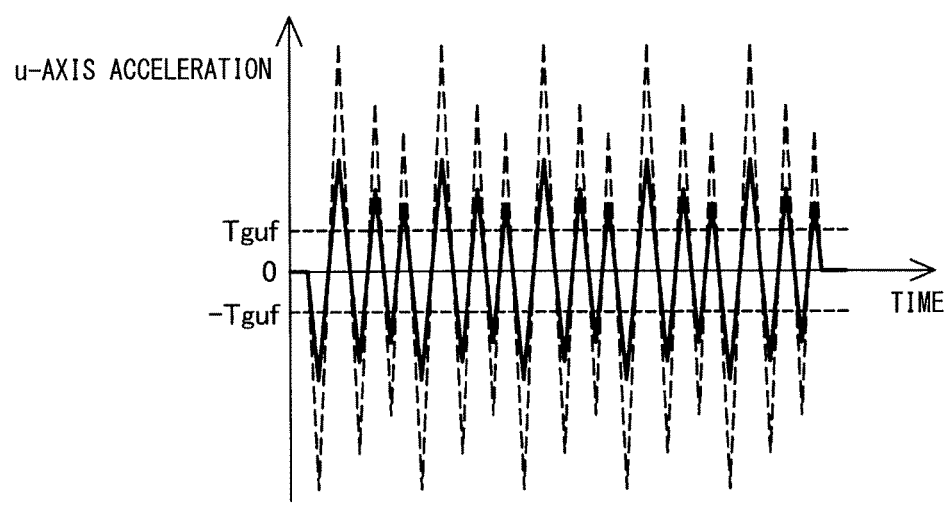
FIG. 12 is a diagram exemplifying a change of acceleration when the remote controller is carried.

FIG. 12 is a diagram exemplifying a change of the u-axis acceleration when the remote controller 100 is carried. A broken line shows a graph of the change of actual acceleration. A solid line shows a graph of the change of the acceleration after the smoothing filter process. When the remote controller 100 is carried, the u-axis acceleration after the smoothing filter process exceeds the range between the u-axis threshold −Tguf and the u-axis threshold Tguf.

As shown FIG. 11 and FIG. 12, an acceleration is determined as normal in a state where the input operation is performed. The acceleration is determined as abnormal and the installation state is determined as abnormal, when the remote controller 100 is carried. When the remote controller 100 is carried, it is determined to be in the abnormal installation state. That is, according to the smoothing filter process, it may be possible to determine as the abnormal installation state, a state where the remote controller 100 carried, and in addition, it may be possible to determine as the abnormal installation state, a state where the input operation is performed. When the remote controller 100 is carried, there is a case that the thermo sensor 60 may detect a body temperature of the user. In the second embodiment, limit when the remote controller 100 is carried, it is determined to be in the abnormal installation state. Therefore, it may be possible to prevent that the control of the air-conditioning apparatus 900 is performed erroneously with wrong temperature measurement value.

Similarly, regarding the vibration determination part 33 of the normality determination part 31, the smoothing filter process is performed to the detection value of the acceleration obtained from the three-axis acceleration sensor 30, and it is determined whether vibration occurs in the remote controller 100 with use of a result of the smoothing filter process. According to this configuration, an instantaneous peak of the acceleration when the input operation is performed is smoothed, so that it may be possible to determine that the vibration does not occur. By contrast, when the remote controller 100 is carried, and when the instantaneous peak of the acceleration frequently occurs, it may be possible to determine that the vibration occurs after the smoothing process.

(Third Embodiment)

Figure 13A:
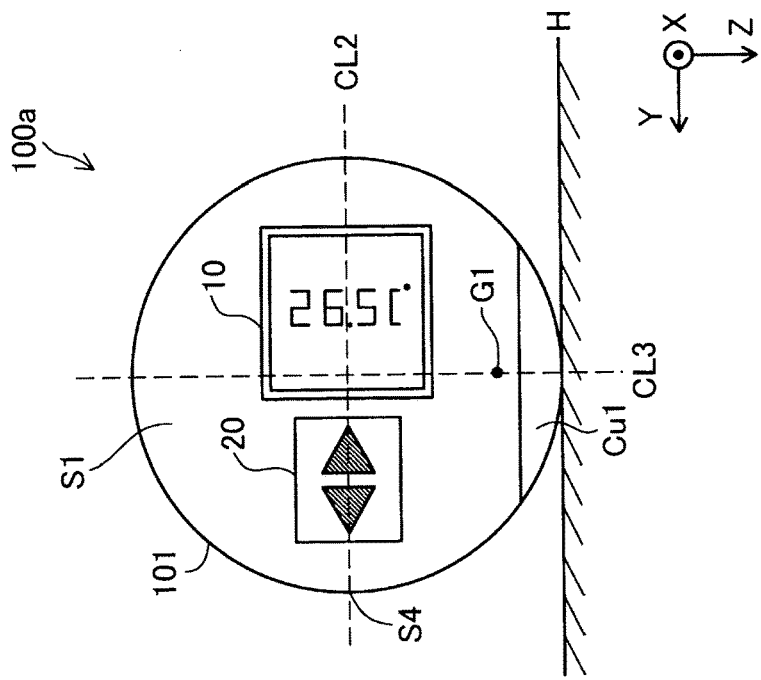
FIG. 13A is a diagram illustrating a status where the remote controller rolls according to a third embodiment.
Figure 13B:
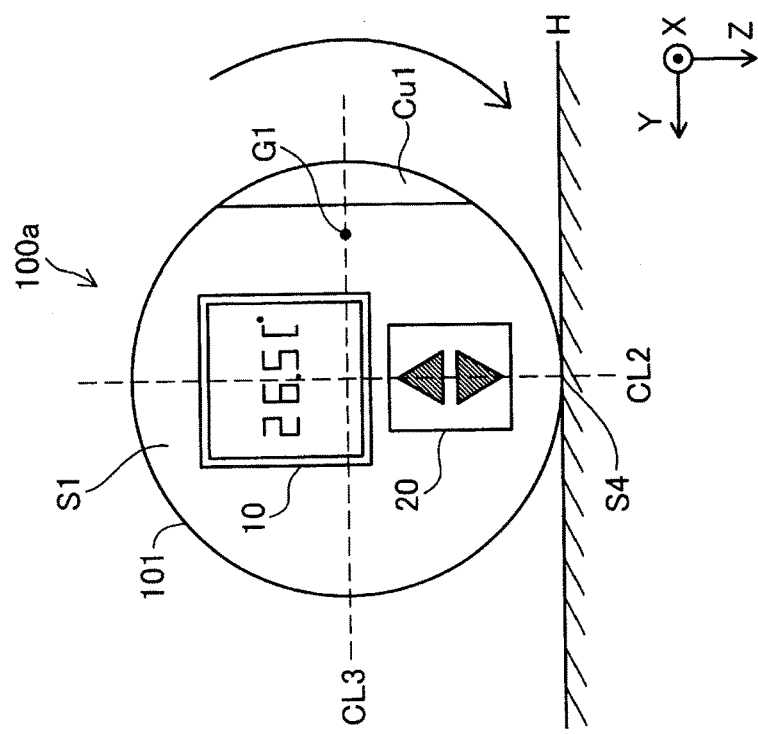
FIG. 13B is a diagram illustrating a status where the remote controller rolls according to a third embodiment.

FIG. 13A and FIG. 13B are diagrams illustrating a status where a remote controller 100a rolls according to the third embodiment and front shape of the remote controller 100a. The position of a centroid G1 is different and the other compositions are mostly same by comparing to the remote controller 100 of the first embodiment.

FIG. 13A illustrates a state of the remote controller 100a when the bottom portion S4 is contacted on the horizontal surface H. FIG. 13B illustrates a front view of the remote controller 100a, which has fallen down. FIG. 13A illustrates a front view before the remote controller 100a falls down. As shown in FIG. 13A and FIG. 13B, the front face S1 of the remote controller 100a is quartered by a central axis line CL2 and a central axis line CL3. The central axis line CL2 corresponds to the vertical direction to the horizontal surface H when the remote controller 100a is installed on the horizontal surface H with the bottom portion S4 of the main part 101 downward. The slop face Cu1 is positioned on the right side of the central axis line CL2 and positioned to go through the central of a longitudinal direction by the central axis line CL3. The centroid G1 is positioned right side of the central axis CL2 and is positioned on the central axis CL3. When the remote controller 100a is installed on the horizontal surface H with the bottom portion S4 of the main part 101 downward, the remote controller 100a rolls to the rightward, as illustrated by an arrow in FIG. 13A. When the centroid G1 reaches the lowest point, the remote controller 100a stops rolling.

Figure 14A:
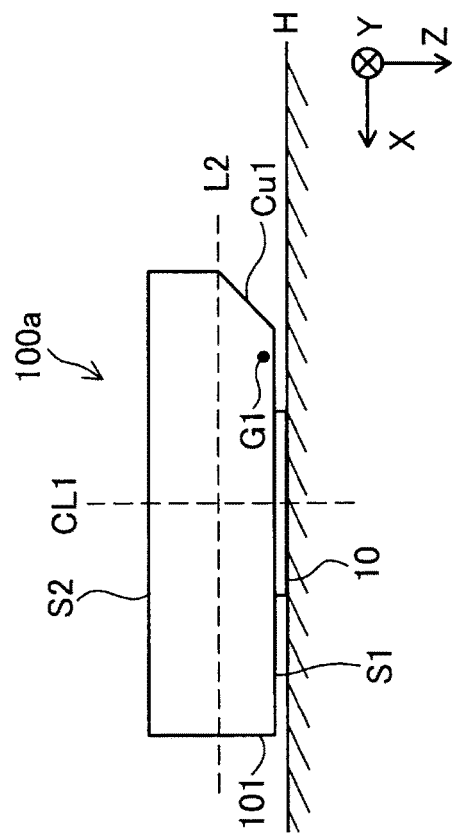
FIG. 14A is a diagram illustrating a status where the remote controller falls down.
Figure 14B:
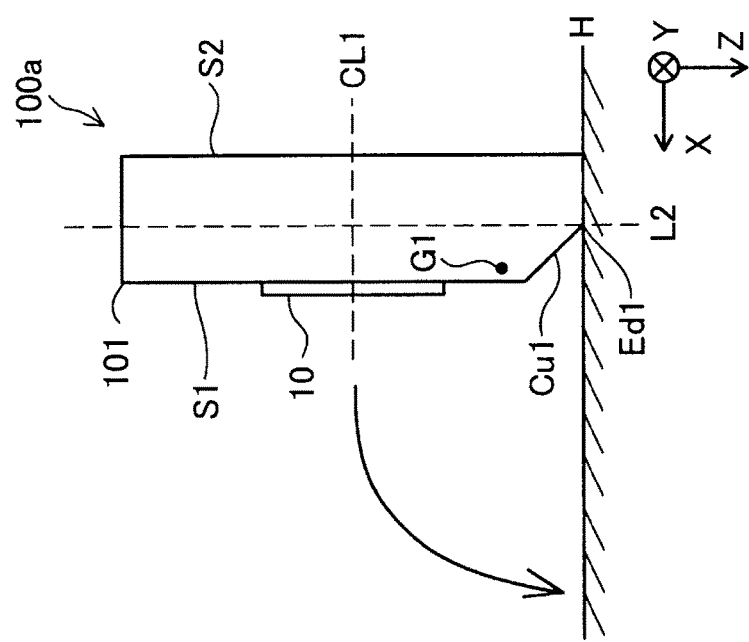
FIG. 14B is a diagram illustrating a status where the remote controller falls down.

FIG. 14A and FIG. 14B show a side view of the remote controller 100a. FIG. 14B illustrates a front view of the remote controller 100a, which has fallen down. In another words, FIG. 14B illustrates a side view of the remote controller 100a when the centroid G1 reaches the lowest point relative to the horizontal surface H. FIG. 14A illustrates a side view before the remote controller 100a falls down. As shown in FIG. 14A, a line L2 goes through an edge Ed1 of the slop face Cu of the main part 101 and extends vertically along the Z-direction. As shown in FIG. 14A, the centroid G1 is positioned outside a line L2. When a gravitational affection causes the remote controller 100a to fall, the remote controller 100a falls down with the front face S1 downward, as shown in FIG. 14B.

In the third embodiment, the normality determination part 31 determines the installation state of the remote controller 100a as abnormal when the remote controller 100a falls down with the front face S1 downward. When the installation state of the remote controller 100a is determined as abnormal, a control of the air-conditioning apparatus 900, which is performed by the input operation to the operation part 20 is limited, and the control part 42 stops transmitting the control information to the air-conditioning apparatus 900. When the remote controller 100a is determined to be in the abnormal installation state and does not measure the environment temperature precisely, it may be possible to prevent a wrong control of the air-conditioning apparatuses 900. The way is adapted to the state that the remote controller 100a falls down with the back face S2 downward.

(Fourth Embodiment)

Figure 15A:
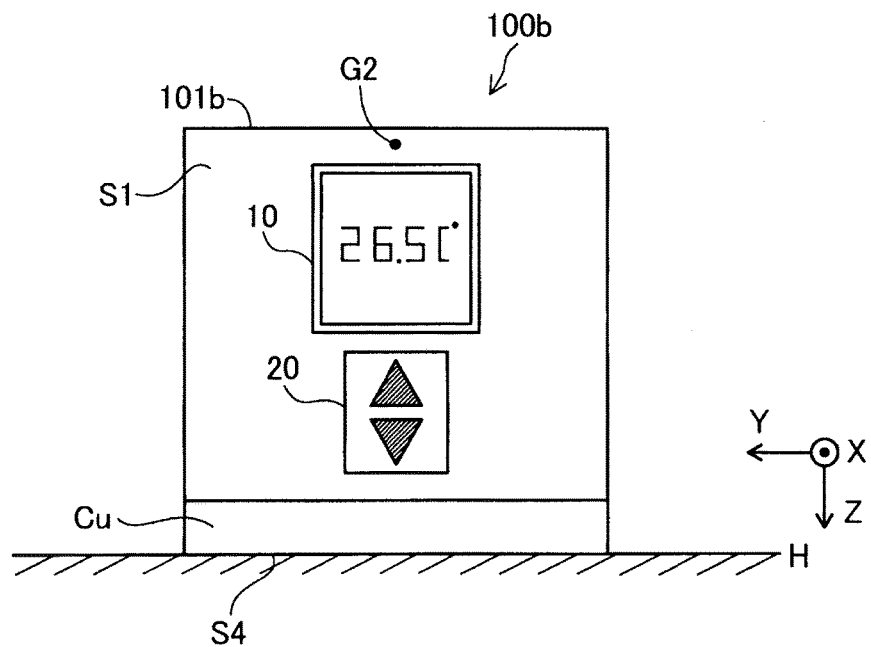
FIG. 15A is an external view of the remote controller according to a forth embodiment.
Figure 15B:
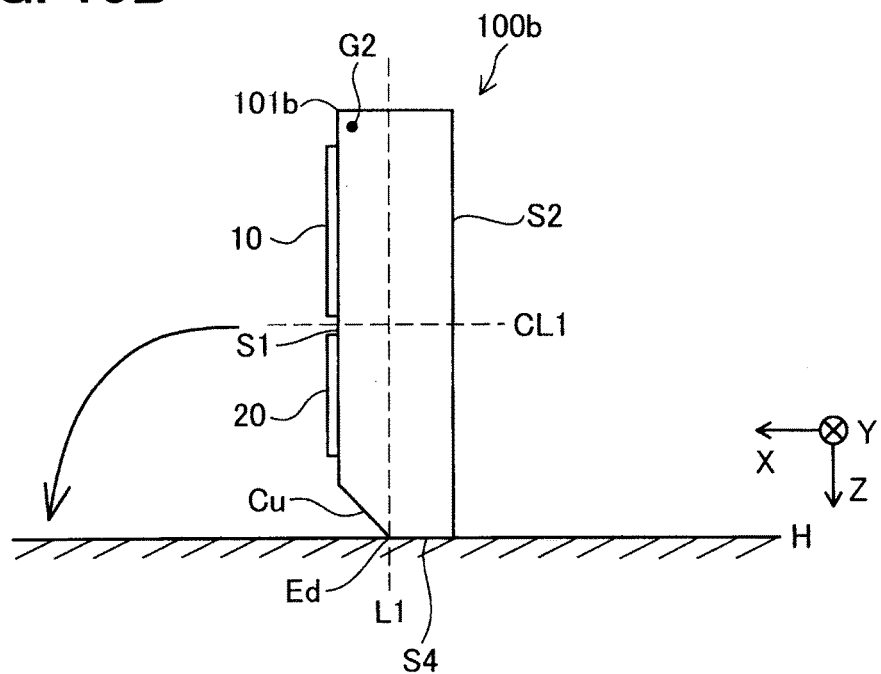
FIG. 15B is an external view of the remote controller according to a forth embodiment.

FIG. 15A and FIG. 15B illustrate an external view of a remote controller 100b according to the fourth embodiment. FIG. 15A illustrates a front view of the remote controller 100b. FIG. 15B illustrates a side view of the remote controller 100b. The shape of the main part 101b and a position of a centroid G2 are different, and the other parts are mostly same in comparison with the remote controller 100 of the first embodiment of FIG. 1. A main part 101b of the remote controller 100b has substantially a cuboid shape. The bottom portion S4 of the main part 101b is flat face. The centroid G2 is positioned outside the line L1, which goes through the edge Ed of the bottom portion S4 in the vertical direction. When a gravitational affection causes the remote controller 100b to fall down, the remote controller 100b falls down with the front face S1, as shown in FIG. 15B.

In the fourth embodiment, the normality determination part 31 determiners the installation state of the remote controller 100b as abnormal based on the detection value of the three-axis acceleration sensor 30 when the remote controller 100b falls down with the front face S1 downward. When the installation state of the remote controller 100b is determined as abnormal, the control part 42 stops transmitting the control information to the air-conditioning apparatus 900. When the remote controller 100b does not measure the environment temperature precisely in the abnormal installation state, it may be possible to prevent that the control of the air-conditioning apparatus 900 is performed erroneously. The way is adapted to the state that the remote controller 100b falls down with the back face S2 downward.

(Fifth Embodiment)

Figure 16A:
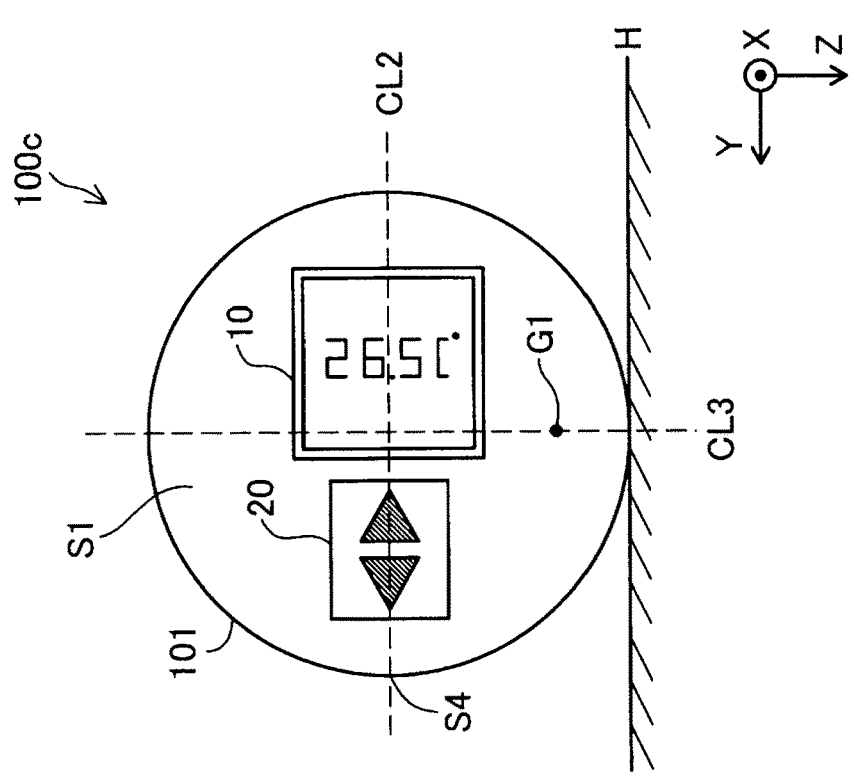
FIG. 16A is a diagram illustrating a state where the remote controller rolls according to a fifth embodiment.
Figure 16B:
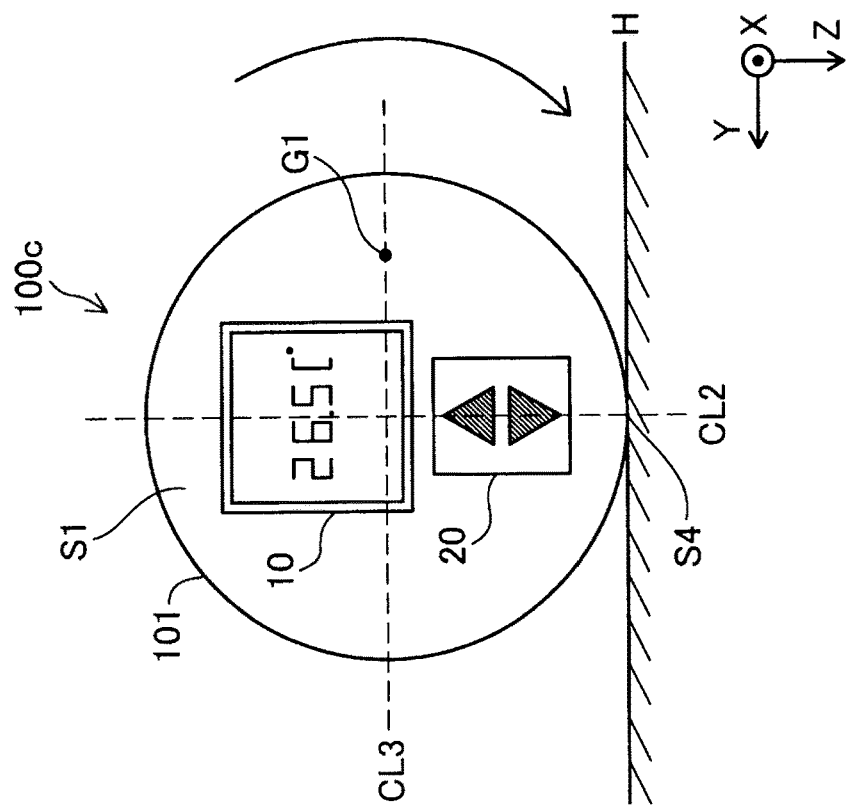
FIG. 16B is a diagram illustrating a state where the remote controller rolls according to a fifth embodiment.

FIGS. 16A and 16B show diagrams illustrating an external view of a remote controller 100c, which rolls according to the fifth embodiment and corresponding to FIG. 13A and FIG. 13B. The main part 101 of the remote controller 100c does not include the slope face Cu1 and the other compositions are mostly same by comparing to the third embodiment of FIG. 13A and FIG. 13B.

FIG. 16A illustrates a state of the remote controller 100c when the bottom portion S4 is placed on the horizontal surface H. FIG. 16B illustrates a front view of the remote controller 100c, which is rolling. FIG. 16A illustrates a front view before the remote controller 100c rolls. As shown in FIG. 16A, when the remote controller 100c is placed on the horizontal surface H with the bottom portion S4 of the main part 101 downward, the gravitational affection to the centroid G1 cause the remote controller 100c rolls to the right by like an arrow. When the centroid G1 reaches at lowest point, the remote controller 100c stops rolling. The remote controller 100c does not fall down with the front face S1 downward since the main part 101 does not include the slope face Cu1.

As described above, in the present application, "an abnormal installation state" includes a state where the remote controller 100 falls down with the front face S1 downward, and a state where the remote controller 100c stops rolling (FIG. 16A and FIG. 16B).

According to one aspect of the present disclosure, a remote controller that can control the air-conditioning apparatuses is provided. The remote controller includes: a main part that includes a back face facing toward a wall surface when the remote controller is installed on the wall surface, a front face opposite to the back face in the main part, and a bottom facing a downward direction corresponding to a gravitational direction when the remote controller is installed on the wall surface; a three-axis acceleration sensor that detects three-axis accelerations applied to the main part; a normality determination part that determines whether an installation state of the remote controller is in a normal installation state or in an abnormal installation state, based on a detection value of the three-axis acceleration sensor; a stationary state determination part that determines whether the installation state of the remote controller is in a stationary state based on the detection value of the three-axis acceleration sensor; a vibration determination part that determines whether a vibration occurs in the remote controller based on the detection value of the three-axis acceleration sensor; a thermo sensor that measures environment temperature; and a control part that controls the air-conditioning apparatus based on the environment temperature measured by the thermo sensor. The main part has a particular shape and a centroid, and the remote controller is in the abnormal installation state due to the shape and the centroid when the remote controller is placed on a horizontal surface with the bottom of the main part downward. The control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

According to the remote controller, the control part limits the control of the air-conditioning apparatus based on the environment temperature when the stationary state part determines to be in the stationary state and the normality determination part determines to be in the abnormal installation state within the predetermined period of time immediate after the vibration determination part determines that the vibration occurs. Therefore, when the remote controller in the abnormal installation does not measure the environment temperature precisely, it may be possible to prevent the control of the air-conditioning apparatus from being erroneously performed. When the remote controller is not installed in the wall surface even in the stationary state, the remote controller can easily fall down due to the shape of the main part or the centroid. The vibration part can effectively detect the vibration that occurs when the remote controller falls down. When the remote controller is installed on the wall surface, the vibration does not occur since the remote controller is fastened without falling down. When the remote controller stops within the predetermined period of time after the vibration is detected, it may be possible to determine that the remote controller is placed in another place without installation on the wall surface. Therefore, it may be possible to detect the installation state of the remote controller, that is, a state where the remote controller becomes still without installation on the wall surface.

Further, according to another aspect of the present disclosure, a remote controller capable of controlling an air-conditioning apparatus includes: a main part that includes a back face facing toward a wall surface when the remote controller is installed on the wall surface, a front face opposite to the back face in the main part, and a bottom facing a downward direction corresponding to a gravitational direction when the remote controller is installed on the wall surface; a two-axis acceleration sensor that detects, when the remote controller is installed on the wall surface, an acceleration in a direction perpendicular to the front face of the main part and an acceleration in the gravitational direction; a normality determination part that determines whether the installation state of the remote controller is in a normal installation state or in an abnormal installation state based on a detection value of the two-axis acceleration sensor; a stationary state determination part that determines whether the installation state of the remote controller is in a stationary state based on the detection value of the two-axis acceleration sensor; a vibration determination part that determines whether a vibration occurs in the remote controller based on the detection value of the two-axis acceleration sensor; a thermo sensor that measures environment temperature; and a control part that controls the air-conditioning apparatus based on the environment temperature measured by the thermo sensor. The main part has a particular shape and a centroid, and the remote controller is in the abnormal installation state due to the shape and the centroid when the remote controller is placed on a horizontal surface with the bottom of the main part downward. The control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

According to the remote controller, the control part limits the control of the air-conditioning apparatus based on the environment temperature when the stationary state determination part determines to be in a stationary state and the normality determination part determines that the installation state of the remote controller is in the abnormal installation state within the predetermined period of time immediate after the vibration determination part determines that the vibration occurs. Therefore, when the remote controller in the abnormal installation state does not measure the environment temperature precisely, it may be possible to prevent an erroneous control of the air-conditioning apparatus.

Further, according to another aspect of the present disclosure, the remote controller may include an operation part that is provided to the front face of the main part, and capable of inputting an input operation to control the air-conditioning apparatus. The control part may control the air-conditioning apparatuses based on the input operation of the operation part. The control part during the limited control may invalidate the control of the air-conditioning apparatus based on the input operation.

According to the remote controller, it may be possible to prevent an input by mistake occurring when an object is contacted with the remote controller in the abnormal installation state. Therefore, it may be possible to further prevent an erroneous control of the air-conditioning apparatus.

Further, according to another aspect of the present disclosure, the main part may have the shape and the centroid, and the remote controller may fall down with the front face downward due to the shape and the centroid when the remote controller is placed on the horizontal surface with the bottom of the main part downward.

According to the remote controller, the remote controller certainly falls down with the front face downward when the remote controller is installed on the horizontal surface with a bottom of the main part downward. In this way, it may be possible to prevent that the input operation is performed erroneously by contacted to a something in the abnormal installation state since the remote controller can fall down with the operation part downward intentionally.

Further, according to another aspect of the present disclosure, the abnormal installation state may include a state where the remote controller has fallen down with the front face downward.

According to the remote controller, it may be possible to prevent that the input operation is performed erroneously by being contacted to a something in the abnormal installation state since the control of air-conditioning apparatus by the input operation is prevented when the remote controller falls down with the front face downward. It may be possible to further prevent the erroneous control of air-conditioning apparatus is performed.

Further, according to another aspect of the present disclosure, the vibration determination part may apply a smoothing filter process to a detection value of the three-axis acceleration sensor, and determine whether the vibration occurs in the remote controller based on a result of the smoothing filter process.

According to the remote controller, it may be possible to determine that there is no vibration by smoothing the instantaneous acceleration peak when the input operation is performed. By contrast, when the acceleration peak frequently occurs due to a carrying state of the remote controller, it may be possible to determine that the vibration occurs after the smoothing.

Further, according to another aspect of the present disclosure, the control part may limit the control of the air-conditioning apparatus based on the environment temperature, when, within a predetermined period of time immediate after the vibration determination part determines that the vibration occurs, the stationary state determination state determines that the installation state is in the stationary state and also the normality determination part determines that the installation state of the remote controller is in the abnormal installation state for a predetermined number of times or over the predetermined number of times within a predetermined period of time.

According to the remote controller, even when it is immediately determined to be in the abnormal state based on a small vibration, it may be possible to prevent from limiting the control.

Further, according to another aspect of the present disclosure, the remote controller may further include a cradle on which the remote controller is mounted. The cradle may be configured so that an angle between the front face of the main part and a horizontal direction is larger than zero when the remote controller is mounted on the cradle. The normality determination part may determine that the installation state of the remote controller is in the normal installation state when the remote controller is mounted on the cradle.

According to the remote controller, it may be possible to prevent from determining as the abnormal installation state, a state where the remote controller is installed on the cradle.

The present disclosure can be described according to the various embodiment excepted for above embodiments. For example, it is realized in the embodiment of a manufacturing method of a remote control system and the remote controller.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A remote controller capable of controlling an air-conditioning apparatus, comprising:
    a main part that includes:
        a back face facing toward a wall surface when the remote controller is installed on the wall surface;
        a front face opposite to the back face in the main part; and
        a bottom facing a downward direction corresponding to a gravitational direction when the remote controller is installed on the wall surface;
    a three-axis acceleration sensor that detects three-axis accelerations applied to the main part;
    a normality determination part that determines whether an installation state of the remote controller is in a normal installation state or in an abnormal installation state, based on a detection value of the three-axis acceleration sensor;
    a stationary state determination part that determines whether the installation state of the remote controller is in a stationary state based on the detection value of the three-axis acceleration sensor;
    a vibration determination part that determines whether a vibration occurs in the remote controller based on the detection value of the three-axis acceleration sensor;
    a thermo sensor that measures environment temperature; and
    a control part that controls the air-conditioning apparatus based on the environment temperature measured by the thermo sensor;
    wherein:
    the main part has a particular shape and a centroid, and the remote controller is in the abnormal installation state due to the shape and the centroid when the remote controller is placed on a horizontal surface with the bottom of the main part downward; and
    the control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

2. The remote controller according to claim 1, further comprising:
    an operation part that is provided to the front face of the main part, and capable of inputting an input operation to control the air-conditioning apparatus,
    wherein:
    the control part further controls the air-conditioning apparatuses based on the input operation of the operation part; and the control part during the limited control invalidates the control of the air-conditioning apparatus based on the input operation.

3. The remote controller according to claim 1, wherein:
the main part has the shape and the centroid, and the remote controller falls down with the front face downward due to the shape and the centroid when the remote controller is placed on the horizontal surface with the bottom of the main part downward.

4. The remote controller according to claim 1, wherein:
the abnormal installation state includes a state where the remote controller has fallen down with the front face downward.

5. The remote controller according to claim 1, wherein:
the vibration determination part applies a smoothing filter process to a detection value of the three-axis acceleration sensor, and determines whether the vibration occurs in the remote controller based on a result of the smoothing filter process.

6. The remote controller according to claim 1, wherein:
the control part limits the control of the air-conditioning apparatus based on the environment temperature, when, within a predetermined period of time immediate after the vibration determination part determines that the vibration occurs, the stationary state determination state determines that the installation state is in the stationary state and also the normality determination part determines that the installation state of the remote controller is in the abnormal installation state for a predetermined number of times or over the predetermined number of times within a predetermined period of time.

7. The remote controller according to claim 1, further comprising:
a cradle on which the remote controller is mounted, wherein:
the cradle is configured so that an angle between the front face of the main part and a horizontal direction is larger than zero when the remote controller is mounted on the cradle; and
the normality determination part determines that the installation state of the remote controller is in the normal installation state when the remote controller is mounted on the cradle.

8. A remote controller capable of controlling an air-conditioning apparatus, comprising:
a main part that includes:
a back face facing toward a wall surface when the remote controller is installed on the wall surface;
a front face opposite to the back face in the main part; and
a bottom facing a downward direction corresponding to a gravitational direction when the remote controller is installed on the wall surface;
a two-axis acceleration sensor that detects, when the remote controller is installed on the wall surface, an acceleration in a direction perpendicular to the front face of the main part and an acceleration in the gravitational direction;
a normality determination part that determines whether the installation state of the remote controller is in a normal installation state or in an abnormal installation state based on a detection value of the two-axis acceleration sensor;
a stationary state determination part that determines whether the installation state of the remote controller is in a stationary state based on the detection value of the two-axis acceleration sensor;
a vibration determination part that determines whether a vibration occurs in the remote controller based on the detection value of the two-axis acceleration sensor;
a thermo sensor that measures environment temperature; and
a control part that controls the air-conditioning apparatus based on the environment temperature measured by the thermo sensor;
wherein:
the main part has a particular shape and a centroid, and the remote controller is in the abnormal installation state due to the shape and the centroid when the remote controller is placed on a horizontal surface with the bottom of the main part downward; and
the control part performs a limited control that includes limitation of a control of the air-conditioning apparatus based on the environment temperature when, within a predetermined period of time immediate after the vibration determination part determines that the vibration occurs, the stationary state determination part determines that the installation state is in the stationary state and also the normality determination part determines that the installation state is in the abnormal installation state.

9. The remote controller according to claim 8, further comprising:
an operation part that is provided to the front face of the main part, and capable of inputting an input operation to control the air-conditioning apparatus,
wherein:
the control part further controls the air-conditioning apparatuses based on the input operation of the operation part; and
the control part during the limited control invalidates the control of the air-conditioning apparatus based on the input operation.

10. The remote controller according to claim 8, wherein:
the main part has the shape and the centroid, and the remote controller falls down with the front face downward due to the shape and the centroid when the remote controller is placed on the horizontal surface with the bottom of the main part downward.

11. The remote controller according to claim 8, wherein:
the abnormal installation state includes a state where the remote controller has fallen down with the front face downward.

12. The remote controller according to claim 8, wherein:
the vibration determination part applies a smoothing filter process to a detection value of the two-axis acceleration sensor, and determines whether the vibration occurs in the remote controller based on a result of the smoothing filter process.

13. The remote controller according to claim 8, wherein:
the control part limits the control of the air-conditioning apparatus based on the environment temperature, when, within a predetermined period of time immediate after the vibration determination part determines that the vibration occurs, the stationary state determination state determines that the installation state is in the stationary state and also the normality determination part determines that the installation state of the remote controller is in the abnormal installation state for a predetermined number of times or over the predetermined number of times within a predetermined period of time.

14. The remote controller according to claim 8, further comprising:
- a cradle on which the remote controller is mounted, wherein:
- the cradle is configured so that an angle between the front face of the main part and a horizontal direction is larger than zero when the remote controller is mounted on the cradle; and
- the normality determination part determines that the installation state of the remote controller is in the normal installation state when the remote controller is mounted on the cradle.

* * * * *